United States Patent [19]
Dierl et al.

[11] 3,726,359
[45] Apr. 10, 1973

[54] MUFFLER FOR FLOWING GASES

[75] Inventors: Rudolf Dierl, Rossdorf; Peter Rontgen, Giessen; Georg Hinners, Witten, all of Germany

[73] Assignee: Isobertechuik Horst Grassmann, Frankfurt/Main, Germany

[22] Filed: Apr. 21, 1971

[21] Appl. No.: 135,947

[30] Foreign Application Priority Data

Apr. 22, 1970 Germany..................P 20 19 416.5

[52] U.S. Cl.....................181/42, 181/33 G, 181/50, 181/56, 181/63
[51] Int. Cl. ...........................................G10k 11/00
[58] Field of Search ...............181/33 G, 33 GA, 181/33 HB, 36 B, 42, 49, 50, 63, 68, 69, 70, 71, 56

[56] References Cited

UNITED STATES PATENTS

| | | | |
|---|---|---|---|
| 1,974,665 | 9/1934 | Schnetzer et al. | 181/33 G UX |
| 2,270,825 | 1/1942 | Parkinson et al. | 181/70 UX |
| 2,966,954 | 1/1961 | Sabine | 181/33 G UX |
| 3,103,987 | 9/1963 | Gildard et al. | 181/33 G UX |
| 3,507,355 | 4/1970 | Lawson | 181/33 G UX |

FOREIGN PATENTS OR APPLICATIONS

| | | | |
|---|---|---|---|
| 1,391,884 | 2/1965 | France | 181/56 |
| 907,872 | 10/1962 | Great Britain | 181/33 G |

Primary Examiner—Richard B. Wilkinson
Assistant Examiner—John F. Gonzales
Attorney—Michael S. Striker

[57] ABSTRACT

A muffler for flowing gases, particularly for ventilation and air conditioning installations, in the form of a tubular duct of preferably rectangular or square cross section, for the reactive and dissipative absorption of sound, having an externally gastight shell which in its interior contains at least one and preferably a plurality of baffles for muffling the sound, said baffles extending substantially in planes parallel to the direction of flow of the gas and consisting of at least one plate of solid material, such as steel sheet, and of at least one layer of a porous material suitable for absorbing sound, the surfaces of the baffles exposed to the flowing has being of abrasion-resistant construction, wherein the two external cross sectional regions of a baffle which are exposed to the gas stream each consist of a plate provided with perforated areas disposed in bands, the perforated surface area of the bands being smaller than the remaining unperforated surface area and the two plates being so coordinated that across the direction of gas flow the perforated band-like surface areas of the two plates are relatively staggered.

25 Claims, 9 Drawing Figures

MUFFLER FOR FLOWING GASES

BACKGROUND OF THE INVENTION

This invention relates to a muffler for flowing gases, particularly for ventilation and air conditioning installations, in the form of a tubular duct of arbitrary but preferably rectangular or square cross section, for the dissipative and reactive absorption of sound, comprising an externally gastight shell which in its interior contains at least one and preferably a plurality of baffles for muffling the sound, said baffles extending substantially in planes parallel to the direction of flow of the gas and consisting of at least one plate of solid material, such as steel sheet, and of at least one layer of a porous material suitable for absorbing sound, the surfaces of the baffles exposed to the gas being of abrasion-resistant construction.

Such baffles are principally used in ventilating and air conditioning installations, as well as for other purposes, for instance in industrial air ducting and in marine installations. Such mufflers aim firstly to achieve as effective as possible an attenuation of sound and secondly to reduce the resistance to flow offered to the gas to the minimum possible. Different types of mufflers have therefore already been constructed which attenuate sound either dissipatively or reactively, or by a combination of both.

In dissipative mufflers the duct walls are lined on their insides with porous materials. Such a material is for instance a mineral wool. The oscillating particles of gas experience friction in contact with the fibers of the mineral wool and their sonic energy is dissipated by conversion to heat and thus removed from the gas stream. In order to improve this effect when the cross sections are large, baffles are built into the duct which extend substantially parallel to the direction of gas flow. These baffles which substantially have the form of plates comprise a rigid frame of U-shaped cross section, and the interior of the frame is filled with mineral wool or with panels of mineral wool. Although the external surfaces which make contact with the gas stream transmit sound they are abrasion-resistant so that within the desired limits they cannot be damaged by the flowing gas. For this purpose it has already been proposed to cover mineral wool or panels of mineral wool with a foil or a fleece, such as a glass fleece. It has also been proposed to provide the external surfaces of such baffles with perforated sheet metal or perforated plastics panels, the perforations being evenly distributed over the entire surface of the baffle. The interior of such baffles, unless the external panels of mineral wool are sufficiently thick, is filled with a loose mineral wool or with panels of mineral wool.

Among reactive resonant mufflers the best known are the so-called λ/4 resonators. In such mufflers chambers are formed in the baffles by partitions extending across the direction of gas flow, the depth of such chambers being substantially equal to one quarter of the wave length of the sound it is desired to suppress. These chambers are completely filled with a sound absorbent material. A baffle which is located in the gas stream, and which is intended to function on both sides, will therefore have an overall thickness equal to about half the wave length it is principally desired to suppress.

In the case of a muffler which is a combination of a reactive and a dissipative muffler, the baffles in their interior contain one or two sheet metal or plastics unperforated plates provided on each side with a relatively thick layer of a sound-absorbent material, such as mineral wool. The external surfaces of the sound-absorbent material which are in contact with the gas stream are merely covered with a thin fleece or foil and lack other protection. This covering prevents abrasive wear up to a given velocity of flow of the gas. However, it provides no protection from other kinds of mechanical stress. The two external layers of say mineral wool first function dissipatively, as already described. The unperforated plates or plate of solid material inside this baffle permit a resonant effect to be utilized which arises because this plate or these plates are excited by the sound waves to vibrate at their natural frequency and thus to remove some of the acoustic energy from the gas stream. The natural frequencies of such plates depend upon their weight and dimensions.

Conventional mufflers and baffles which are externally provided with sound-absorbent materials protected exclusively by a thin foil or a thin fleece have the major drawback that the baffles are easily damaged, particularly during transportation, assembly and cleaning of the muffler and its baffles. Moreover, damage can be done when the gas stream entrains impurities that are capable of mechanically damaging the delicate surface of the baffles that are merely abrasion-resistant to a clean gas. This drawback does not arise in mufflers in which the external surfaces of the mufflers that make contact with the flowing gas consist of a solid plastics or metal plate. However, in the conventional form of construction these plates are substantially intended to provide surface protection to the sound absorbent material inside the baffle and they do not themselves significantly participate in the attenuating effect on the sound. In this known form of construction sound absorption is poor in the lower frequency range, unless a baffle of exceptional thickness is used to overcome this drawback. However, this introduces a fresh difficulty, namely that conventional mufflers and baffles must be of considerable thickness if they are to have an overall satisfactory attenuating effect. This means that external dimensions must be large, rendering them too bulky to be conveniently accommodated inside a duct. Moreover, the weight of such mufflers is likewise high, a circumstance which also makes handling and assembly rather troublesome. If specific external dimensions are prescribed, then the greater thickness of the baffles reduces the available free cross section of flow through the muffler and the drag in the duct rises considerably. Increased drag and high pressure loss nearly always mean that the associated extractors, blowers, fans etc., must be of correspondingly greater power. This raises the installational as well as the maintenance cost.

SUMMARY OF THE INVENTION

It is therefore the object of the present invention to provide a muffler for flowing gases, particularly for ventilating and air conditioning installations, which is free from the above-described disadvantages, and which contains baffles that combine exceptional mechanical stability and small dimensions with a high sound attenuating efficiency, particularly in the lower frequency range.

According to the present invention this object is attained in that the two external cross sectional regions of a baffle which are exposed to the gas stream each consist of a plate provided with perforated areas disposed in bands, the perforated surface area of said bands being smaller than the remaining unperforated surface area and the two plates being so coordinated that across the direction of gas flow the perforated band-like surface areas of the two plates are relatively staggered.

First and foremost what is hereby achieved is that the outer regions of the baffles are plates, for instance sheet steel plates, which will reliably protect the interior of the baffle consisting for instance of mineral wool. Consequently the baffle is unlikely to be damaged during transportation, assembly and cleaning, particularly the delicate layer of mineral wool inside the baffles. The two plates made of solid material impart considerable stability to the baffle and distortion or warping need not be feared. If the plates of solid material form the actual external surfaces that make contact with the flowing gas, then even major impurities carried along by the gas are unlikely to damage the baffles to a significant extent.

Contrary to the conventional form of construction which likewise contains external plates made of a solid material so that there is likewise no risk of damage, the plates in the proposed muffler and its baffles, which are provided only on the outside of the sections in contact with the gas, actually participate substantially in the muffling effect. It has been found that the plates immediately exhibit a powerful sound-absorbing effect if they are not provided with perforations uniformly across their entire surface, but only in localized band-like areas. The inventors recognized that by providing the plates with perforations in discrete band-like surface areas they could obtain an immediate improvement in the muffling effect, provided that across the direction of gas flow the band-like perforated areas in the two plates were arranged in relatively staggered disposition and the perforated areas were smaller than the remaining surface area lacking perforations. Only if these conditions which are of the essence of the invention are fulfilled will the two plates of a baffle have a substantial attenuating effect, whereas plates which are provided uniformly over their entire surface with perforations, and in which the holes in the two plates are in transverse alignment, have no significant sound absorbing effect. Even a minor degree of overlap between the two perforated band-like surface areas of the two plates of a baffle results in a deterioration in sound absorbing effect. The improvement in sound absorption in a muffler as proposed by the invention is particularly good in the lower frequency range. This means that the proposed muffler and its baffles are particularly useful for attenuating sound in that frequency range in which the efficiency of conventional mufflers and baffles is poor unless they are extremely thick.

Another substantial advantage of the proposed muffler is therefore the thinness of baffles that have a satisfactory effect. It has been found that it is quite sufficient in the proposed muffler to provide baffles that are only half the thickness of the baffles in mufflers of conventional type to muffle the same frequency range. This substantial reduction in the thickness of the baffles naturally results in a reduction of the overall dimensions of the muffler of given performance and providing maximum attenuation in a given range of frequencies. The incorporation of the proposed muffler in an existing or contemplated installation is considerably facilitated by the lower demands it makes upon space. On the other hand, if the dimensions of conventional mufflers are retained or external dimensions are fixed, then the cross sections available inside the muffler for the flow of gas are substantially greater, so that the pressure drop in a muffler as proposed by the invention is less, since the frictional drag experienced by the gas is significantly reduced. Consequently the employment of the proposed muffler working under otherwise the same conditions as a conventional muffler requires fans, blowers and so forth of lower capacity and power so that the installational and operating cost of the entire installation is lower. Moreover, the proposed muffler and its baffles have the further advantage that contrary to conventional resonator type mufflers they lack chambers, a simplification which facilitates the manufacture of the baffles and reduces production cost.

It has proved to be an advantage if the perforated surface area amounts to about 15 to 40 percent and preferably to 20 to 30 percent of the total surface area of a plate. It is also desirable that the open cross section of the perforated surface areas should amount to at least about 20 percent and preferably to 30 to 40 percent of the total surface area occupied by the perforated band. The observance of these dimensional relationships relating to the perforated surface area leads to the best sound absorbing effect which outside the specified dimensional ranges becomes rapidly poorer. If the proportion of the perforated surface area in the total surface area of a plate exceeds 40 percent the mechanical stability of the plate is insufficient and at the same time relative stagger between the perforations in the two plates on opposite sides of a baffle cannot be achieved or it is at least difficult to achieve. However, in special cases it may be possible slightly to exceed the above specified percentages upwards or downwards in order to achieve particular effects.

In a preferred embodiment of the invention the width of the perforated band-like surface area is between 10 and 100 mm. Within this range of widths the baffles will combine stability with a good sound absorbing effect.

Generally, the perforated band-like surface areas will extend substantially perpendicularly to the direction of gas flow. However, it is also possible for the perforated band-like surface areas to extend at an angle of up to 45° to the direction of gas flow.

It is also preferred that the perforations in the band-like perforated surface areas should have the form of a plurality of round holes. Preferably these holes should then have a diameter of about 1 to 10 mm, preferably 3 to 5 mm. It transpires that for the purpose of good sound absorption as well as in the interests of stability of the baffles it is better to provide many small holes than only a few larger ones. The holes need not necessarily be circular. In fact, according to yet another feature of the invention, the perforations in the region of the band-like surface areas may consist of a plurality of angular or substantially elliptical or elongated holes. Moreover, if the perforations thus consist of a plurality of polygonal or substantially elliptical or elongated holes in the band-like surface areas they may with advantage each cover an open cross sectional area of about 1 to 80 sq.mm. These dimensions of the perforations in the band-like surface areas correspond roughly to those of circular holes having the above specified diameters.

However, in principle, the perforations in the region of the perforated bands may also consist of elongated narrow open slots. Principally from the point of view of the strength of such plates it is wise to bridge the slots along their length at least once and preferably several times by a transverse web. The presence of such webs prevents the plates from easily breaking in the region of the slots. Since these slots uncover a relatively large continuous surface of the baffle interior, exposing the sound absorbing material such as the mineral wool underneath, it is preferable to provide, behind the slots, an acoustically transparent but abrasion-resistant surface, for instance a fleece of mineral wool, a suitable foil, layer or the like. Such a surface may naturally also be provided in those embodiments of the invention which contain no slots but only holes, and which therefore expose only relatively small surface areas of the mineral wool inside.

Generally speaking, a baffle in a muffler as proposed by the invention will comprise two plates which are provided with band-like perforated surface areas, and which constitute the surfaces of the baffle that are in contact with the gas stream, a layer of sound absorbing material, such as mineral wool being sandwiched between the two plates. In such a case it is unlikely that the baffles will be damaged even when subjected to mechanical stress. This form of construction can also be used in cases in which the gas stream contains impurities in suspension. On the other hand, another possible form of construction consists in providing a baffle consisting of two plates containing perforated band-like surface areas and enclosing a layer of sound absorbing material, such as mineral wool, between them, and in covering the plate surfaces that are in contact with the gas stream each with a layer of sound-absorbing material, such as mineral wool, having an abrasion-resistant surface, for instance in the form of a fleece of mineral wool. This additional layer of sound-absorbing material functions as a dissipative absorber and further improves the sound muffling effect. Although the overall thickness of the baffle is somewhat greater, it is still less than the thickness of a baffle of the conventional form of construction.

According to a particularly useful feature of the invention the distance between the two plates of a baffle which is exposed to the gas stream on one side is equal to about one eighth, and of a baffle which is exposed to the gas stream on both sides, to about one quarter of the wave length of the sound it is principally desired to suppress. Extensive experimentation has disclosed that when the plates are thus spaced the attenuation of the sound waves that it is desired principally to suppress is an optimum. Therefore the distance between the two plates of a baffle in a muffler as proposed by the invention is only about half that of the corresponding baffle in a conventional muffler. The improvements that have already been mentioned are the result.

From among the many above-mentioned embodiments of the invention that particular embodiment must be chosen in each individual case which will provide optimum efficiency. The choice will depend principally upon the frequency of the sound waves it is desired primarily to suppress. For example, for low frequencies the perforated band-like surface areas should be fairly narrow, say 10 mm, whereas for high frequencies substantially wider perforated band-like surface areas which may be as wide as 100 mm would have to be chosen. The distance between these perforated band-like surface areas follows from the proportion the entire perforated surface area should constitute of the total area in the plate. Moreover, the proportion the actual open area forms of the total area of the plate or of the total perforated band-like area will principally depend upon the frequency of the sound waves it is primarily desired to muffle.

In a number of applications it is desirable that all the baffles of the muffler should have two plates with perforated band-like surface areas. This will be the case chiefly when the sound waves that are to be muffled are within the lower frequency range in which the muffler proposed by the invention works most efficiently. On the other hand, it is also possible that at least one and possibly several baffles of the muffler should have two plates provided with perforated band-like surface areas, whereas the other baffles are of conventional construction. Such a combination of conventional baffles with baffles as proposed by the invention is commendable principally when the sound waves that are to be muffled comprise a wide range of frequencies. In such a case the baffles of the invention are used primarily for attenuating the sound waves in the lower frequency range, whereas the sound waves of particularly high frequencies are substantially absorbed by the baffles of conventional construction. In a muffler of combined construction it is generally advisable to provide inside the shell of the muffler side by side in alternation across the direction of gas flow one baffle having two plates with perforate band-like surface areas and one baffle of conventional construction. However, any other combination of baffles as proposed by the invention and of conventional baffles could naturally also be built. The choice and arrangement will depend mainly upon the frequency range of the sound waves it is desired to attenuate.

According to yet another feature of the invention the two plates of the baffles that are provided with perforated band-like surface areas may consist of a plastics material, preferably polyvinyl chloride or polyethylene. Such plastics plates are corrosion-proof and will not rot and therefore ensure a long life of the muffler. Alternatively the two plates provided with perforated band-like surface areas could be made of a metal, particularly steel or aluminum. In such a case the two baffle plates containing perforated band-like surface areas would have a thickness of 0.5 to 2 mm. Again slight deviations from this specification, principally in the direction of greater thickness, would be quite feasible.

Finally it is possible to provide a layer of sound-absorbing material on the inside of the shell of the muffler, on that side of its cross section that is in contact with the gas stream, with a plate likewise provided with spaced perforated band-like surface areas corresponding to those on the muffler. In this case only one plate having the perforated bands is present, masking a layer consisting of a sound-absorbing material, whereas the external boundary of this sound-absorbing layer is a gastight plate lacking any kind of perforation, opening, slot or the like.

BRIEF DESCRIPTION OF THE DRAWINGS

Some embodiments of the invention will now be described by way of example and with reference to the accompanying drawings, in which.

DESCRIPTION OF THE PREFERRED EMBODIMENTS

Figure 1:
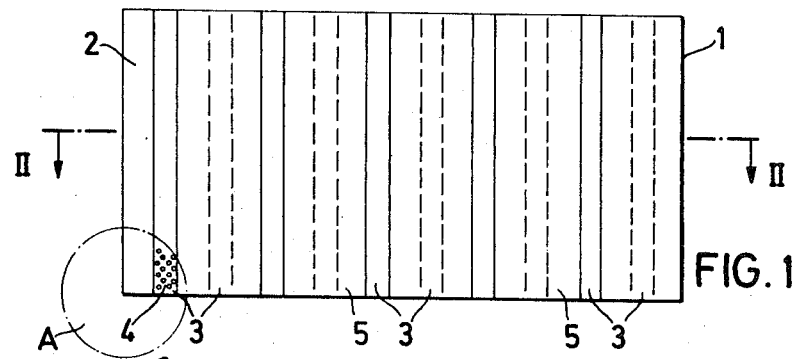
FIG. 1 is a side elevation of a baffle for a muffler according to the invention.
Figure 2:
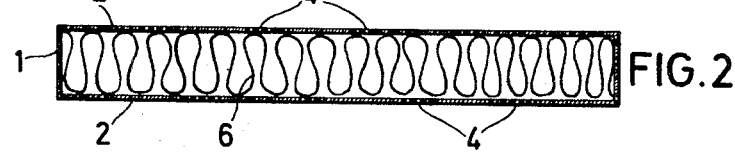
FIG. 2 is a section on the line II — II in FIG. 1.

FIGS. 1 and 2 show a baffle 1 which is built in the conventional manner into a duct of arbitrary, preferably rectangular or square cross section, and which in conjunction with the duct forms a muffler for instance for use in a ventilating or air conditioning installation. The baffle 1 consists of a frame of U-section, not shown in FIG. 1 and consisting for instance of sheet steel containing two external thin sheet steel plates 2 of which one is clearly shown in FIG. 1. The plates 2 contain several perforated band-like surface areas 3 and in FIG. 1 the perforations have the form of round holes 4, as indicated in the left hand bottom corner of this Figure. For the sake of clarity in the drawings these holes 4 are not shown everywhere, their locations in bands 3 being merely indicated. These bands 3 in the plate 2 facing away from the plane of the drawings are indicated by discontinuous lines, since in the side view in FIG. 1 they would be invisible. However, it will be clearly seen that the perforated bands 3 containing the holes 4 in the two plates are relatively staggered. Between the bands 3 the plates contain closed surface areas 5.

The association of the perforated bands 3 in the two plates 2 is also shown in FIG. 2 where the holes 4 in the plates 2 are indicated by gaps in the line that represents the plates 2. Likewise shown in FIG. 2 is the provision between the two external plastics or sheet metal plates 2 of a sound absorbing material 6, there being no further objects or cavities inside the baffle 1. The sound absorbing material 6 may also have the form of a mechanically relatively firm plate or it may be loosely introduced.

Figure 3:
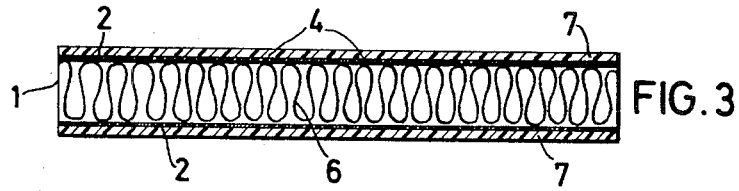
FIG. 3 is a section similar to FIG. 2 of a different embodiment of a baffle.

FIG. 3 substantially illustrates the same arrangement as that in FIG. 2 excepting that the outsides of the plates 2 are additionally provided with a layer 7 of sound absorbing material. The external surfaces of the layers 7 are abrasion-resistant at least to flowing gases. This property may be provided for instance by the superimposition of a fleece or foil. Such a fleece or foil must, however, transmit sound to avoid impairing the muffling effect of the baffle 1.

Figure 4:
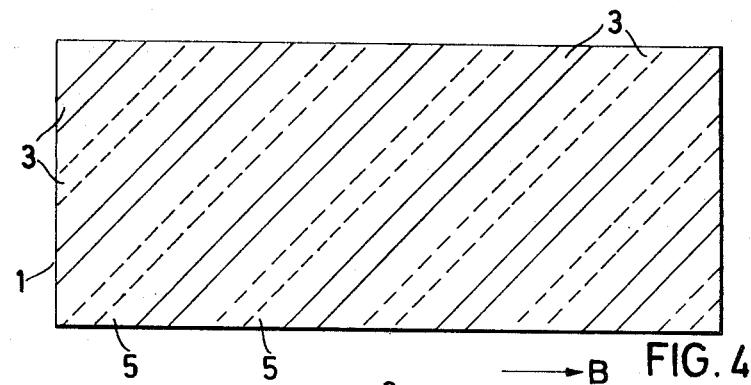
FIG. 4 is a side view of a baffle containing perforated band-like areas extending obliquely to the direction of gas flow.

The baffle shown in FIG. 4 is in principle similar to that in FIGS. 1 and 2, excepting that the perforated bands 3 are arranged to run at an angle of 45° to the direction of flow of the gas, which is indicated in FIG. 4 by an arrow B.

Figure 5:
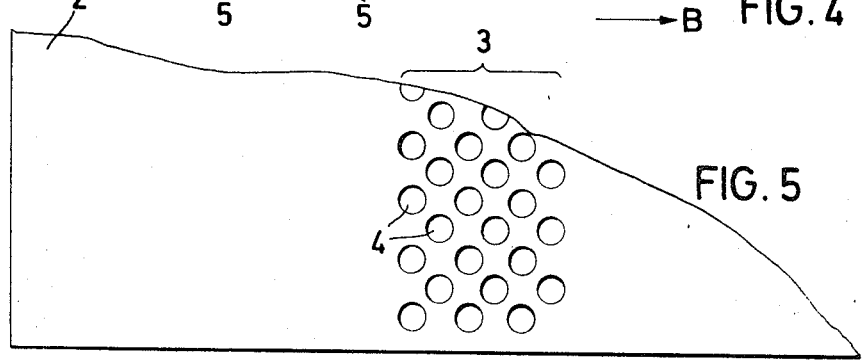
FIG. 5 is a detail of FIG. 1 as at A, shown on a larger scale.

FIG. 5 clearly shows that the perforations in the bands 3 are round holes 4. These round holes 4 are likewise relatively staggered, an arrangement which is advantageous primarily from the point of view of the stability of the plate 2. However, in principle it would be feasible to dispose the perforations in rows across or parallel to the direction of flow B. Moreover, instead of round holes 4 holes or windows of diverse configurations could be chosen, for instance the holes might have the form of elongated slots or gaps.

Figure 6:
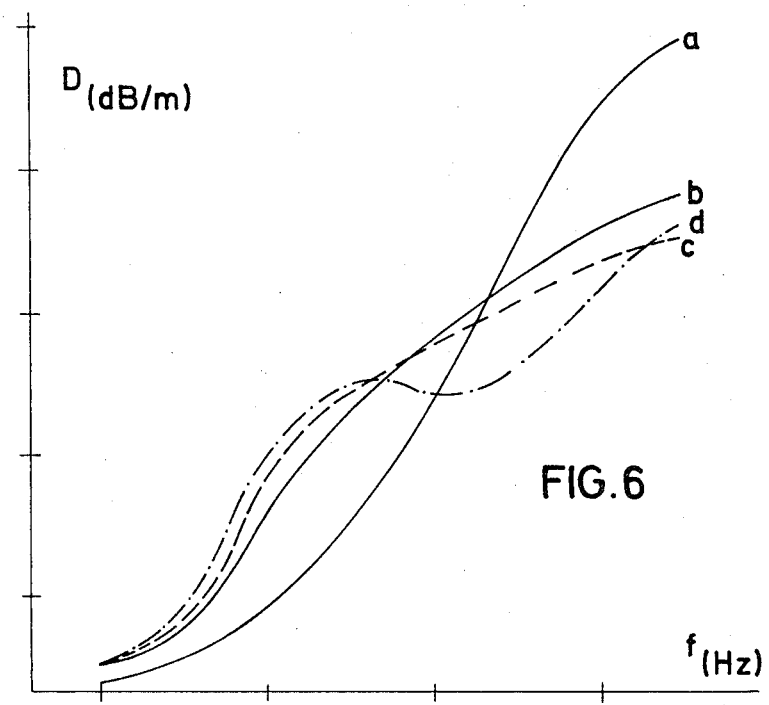
FIG. 6 is a representation in graph form of the attenuation provided by baffles according to the invention, compared with a baffle of conventional construction.

FIG. 6 is a graph in which rising frequencies in Hz of the sound oscillations that are to be muffled are plotted with reference to the abscissa from left to right, whereas the coordinate bears a graduation indicating the attenuation of sound per meter axial length of the muffler in the direction of gas flow. The thick line curve marked $a$ is the attenuation curve of a conventional muffler. The thinner full line curve $b$, the dashed curve $c$ and the dot-dash curve $d$ are attenuation curves of mufflers as proposed by the invention, the curves being based on baffles that differ in the ratio of the width of the perforated bands 3 in the plates to the width of the unperforated areas thereinbetween. Curve $b$ shows the attenuation achieved when the width of the perforated bands 3 is about 90 mm, whereas $c$ represents the attenuation when the average width of the perforated bands is about 50 mm, and curve $d$ when the perforated bands have the relatively narrow width of about 10 mm. It will be seen that when the perforated bands are relatively narrow, such as 10 mm, attenuation is particularly effective in the lower frequency range. Attenuation in the lower frequency range becomes poorer as the width of the perforated bands increases. However, in all the illustrated cases attenuation is very superior in the lower frequency range to that of conventional forms of construction, the thickness of the baffle and their center spacing being otherwise equal. The proposed muffler is therefore principally suitable for attenuating low frequency sound waves, particularly at frequencies below 500 Hz. The initially described conventional mufflers have better attenuating effects at higher frequencies than a muffler according to the invention. In cases in which it is desired to muffle the lower frequency as well as the higher frequency sound waves it is therefore advisable to combine baffles according to the invention with baffles according to the state of the art.

Figure 7:
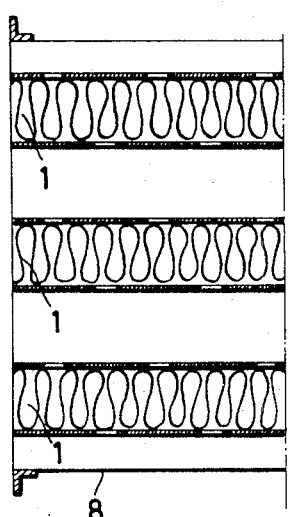
FIGS. 7 to 9 are horizontal sections of mufflers containing baffles of different kinds.
Figure 8:
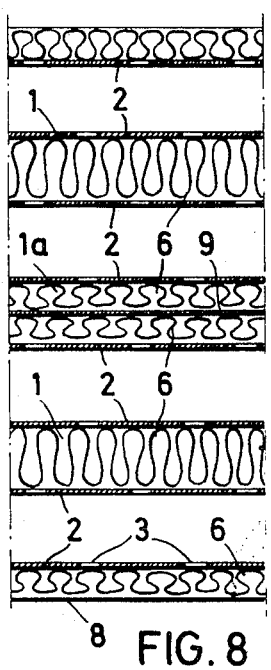
Figure 9:
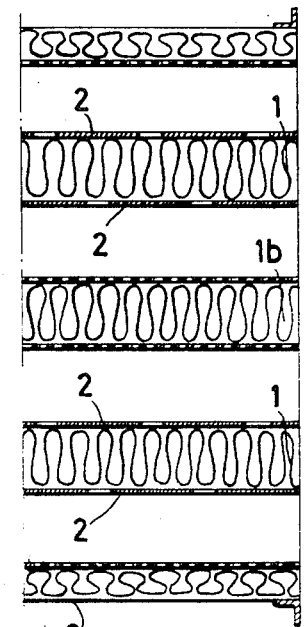

Such combinations of baffles of different kinds in a muffler are illustratively shown in FIGS. 7 to 9. FIG. 7 is a muffler containing three baffles 1 of the kind shown in FIG. 2. The tubular duct respectively its shell is here also clearly shown and marked 8. FIG. 8 is a longitudinal section of a muffler in which two baffles 1 according to FIG. 2 are combined with a baffle 1a which corresponds to the initially described conventional form of construction because it contains centrally between two external plates 2 a third plate 9 which contains no perforations. Between plates 2 and 9 a sound absorbing material such as mineral wool is again interposed. The baffle 1a may contain external plates 2 of conventional construction. However, these plates 2 may also be contrived as shown in FIGS. 1 or 4, i.e. according to the invention. In the region of the gastight shell 8 of the muffler a layer of sound absorbing material, such as mineral wool, is likewise provided on the inside. On the side of the free cross section of flow this is covered by a plate 2 containing relatively spaced perforated bands 3.

FIG. 9 shows two baffles 1 with plates 2 according to FIGS. 1 or 4 and one baffle 1b with plates 2 evenly perforated throughout as is conventional in the art. The plates 2 associated with the gastight shell 8 of the duct are likewise uniformly perforated throughout in the conventional manner. It will be readily understood that numerous other possible combinations can be devised, but that all of them cannot be shown in the drawings.

What is claimed is:

1. A muffler for flowing gases, particularly for ventilations and air conditioning installations in the form of a tubular duct, for the reactive and dissipative absorption of sound, comprising at least one baffle in said tubular duct extending in a plane substantially parallel to the direction of flow of the gas therethrough, said baffle comprising two plates spaced from each other a distance which is a multiple of the thickness of each plate and a layer of porous sound absorbing material between said two plates, each of said plates being provided with perforated areas arranged in bands spaced in the direction of the flow of gas from each other and extending transverse to said direction and separated from each other by band-like areas which are not perforated, the perforated areas of one plate being offset in said direction with respect to those in the other plate, the perforated surface area being smaller than the non-perforated surface area but is at least 15% of the total area of each plate.

2. A muffler as set forth in claim 1, wherein the outsides of the plates exposed to the gas stream being each provided with a layer of sound absorbing material which has an abrasion-resistant surface.

3. A muffler as set forth in claim 2, wherein said layer of sound absorbing material comprises mineral wool, and wherein said abrasion resistant surface is in the form of fleece of mineral wool.

4. A muffler as set forth in claim 1, wherein the width of the perforated band-like surface area is between 10 and 100 mm.

5. A muffler as set forth in claim 1, wherein the perforated band-like surface areas extend substantially perpendicularly to the direction of gas flow.

6. A muffler as set forth in claim 1, wherein the perforated band-like surface areas extend at an angle of up to 45° to the direction of gas flow.

7. A muffler as set forth in claim 1, wherein the perforations in the band-like perforated area have the form of a plurality of round holes.

8. A muffler as set forth in claim 7, wherein the holes have a diameter between 1 and 10 mm, preferably between 3 and 5 mm.

9. A muffler as set forth in claim 1, wherein the perforations in the region of the band-like surface areas consist of a plurality of polygonal holes.

10. A muffler as set forth in claim 9, wherein said holes each cover an open cross sectional area of about 1 to 80 sq.mm.

11. A muffler as set forth in claim 1, wherein the perforations in the region of the perforated bands consist of elongated narrow open slots.

12. A muffler as set forth in claim 11, wherein the slots are bridged along their length at least once and preferably several times by a web.

13. A muffler as set forth in claim 11, wherein an acoustically transparent, but abrasion-resistant surface is present behind the slots.

14. A muffler as set forth in claim 1, wherein the distance between the two plates of a baffle which is exposed to the gas stream on both sides is to about one quarter of the wave length of the sound it is principally desired to muffle.

15. A muffler as set forth in claim 1, wherein the two plates of the baffles provided with perforated band-like surface areas consist of plastics.

16. A muffler as set forth in claim 1, wherein the two plates of the baffles provided with perforated band-like surface areas consist of metal.

17. A muffler as set forth in claim 1, wherein the two plates of the baffles provided with perforated band-like surface areas have a thickness of about 0.5 to 2 mm.

18. A muffler as set forth in claim 1, wherein the width of the band-like perforated surface areas for muffling primarily the low sound frequencies is about 1/10 of that for muffling primarily the high sound frequencies.

19. A muffler as set forth in claim 1, wherein the perforated surface area is 15–40 percent of the total area of each plate.

20. A muffler as set forth in claim 25, wherein the perforated surface area is 20–30 percent of the total area of each plate.

21. A muffler as set forth in claim 1, wherein the cross section of the perforations in each band of perforations constitutes at least 20 percent of the total area of each band.

22. A muffler as set forth in claim 1, wherein said layer of sound absorbing material comprises mineral wool.

23. A muffler as set forth in claim 1, wherein a plurality of said baffles are arranged in said duct spaced in a direction normal to the stream of gases from each other.

24. A muffler as set forth in claim 23, wherein said duct is of rectangular cross section, and wherein a layer of sound absorbing material is applied to each wall of said duct which extends parallel to said baffles and a plate with spaced band-like perforated surface areas is applied to the surface of said layer facing away from the duct wall.

25. A muffler as set forth in claim 24, wherein the thickness of the layer between the duct wall and said plate is about one-eighth of the wave length of the sound which is principally desired to be muffled.

* * * * *